United States Patent [19]
Marks

[11] Patent Number: 6,039,652
[45] Date of Patent: Mar. 21, 2000

[54] UNIVERSAL JOINT ANGLE DRIVING TOOL

[75] Inventor: Joel Marks, Los Angeles, Calif.

[73] Assignee: WorkTools, Inc., Chatsworth, Calif.

[21] Appl. No.: 08/907,960

[22] Filed: Aug. 11, 1997

[51] Int. Cl.$^7$ ................................. F16D 3/16; F16D 3/84
[52] U.S. Cl. ........................... 464/147; 464/153; 464/170
[58] Field of Search ..................................... 464/100, 101, 464/106, 147, 148, 149, 185, 150, 152, 52, 170; 74/608, 609

[56] References Cited

U.S. PATENT DOCUMENTS

| | | | |
|---|---|---|---|
| 2,750,766 | 6/1956 | Griswold | 464/147 |
| 2,921,451 | 1/1960 | Helmke | 464/106 |
| 3,533,248 | 10/1970 | Freund | 464/150 |
| 4,395,246 | 7/1983 | Taig et al. | 464/153 |
| 4,430,905 | 2/1984 | Bruguera | 464/170 |
| 4,553,949 | 11/1985 | Parks et al. | 464/153 |
| 4,768,995 | 9/1988 | Mangiavacchi . | |
| 4,890,948 | 1/1990 | Bondioli | 464/170 |
| 5,181,885 | 1/1993 | Fabris | 464/170 |
| 5,230,936 | 7/1993 | Misumi et al. | 464/170 |

FOREIGN PATENT DOCUMENTS

| | | | |
|---|---|---|---|
| 547820 | 12/1922 | France | 464/148 |
| 3-168417 | 7/1991 | Japan | 464/100 |
| 1213778 | 12/1970 | United Kingdom | 464/100 |

*Primary Examiner*—Eileen Dunn Lillis
*Attorney, Agent, or Firm*—Brad I Goldstein

[57] ABSTRACT

A Hookes universal joint assembly which, in a preferred embodiment, comprises two series connected universal joints to produce an angle change of 60° to 70°. A rigid housing confines input and output rotating drive shafts. In a preferred embodiment the yokes and cross members are formed as flat steel plates with tab-into-notch engagements. A method to retain an input shank and an end linkage to a drive shaft is disclosed. End linkages have parallel extending legs where the legs have protruding bumps at a distal end to engage exterior notched slots of input and output drive shafts. The drive shafts are identical in structure. An input shank is permanently held in a recess of the input drive shaft by engagement of a rib of the housing into a groove around the input shank.

4 Claims, 5 Drawing Sheets

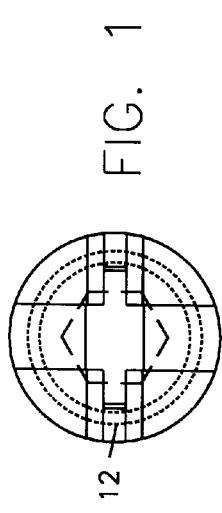
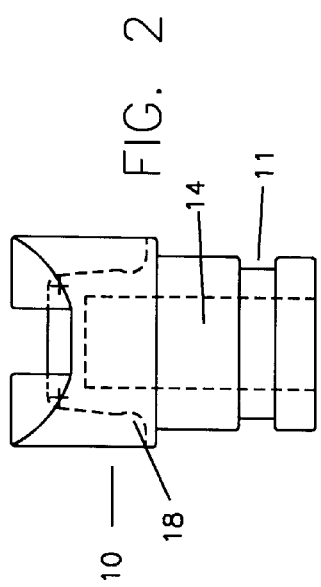
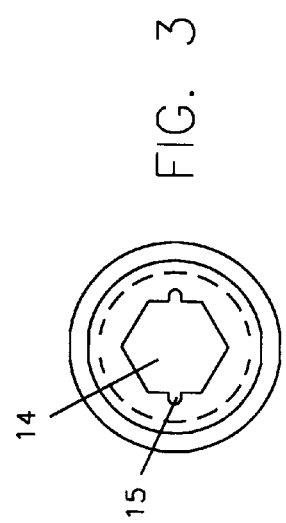
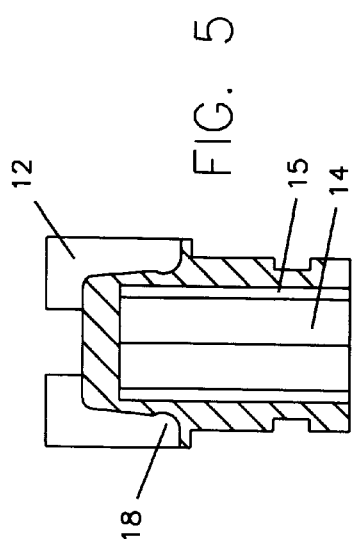
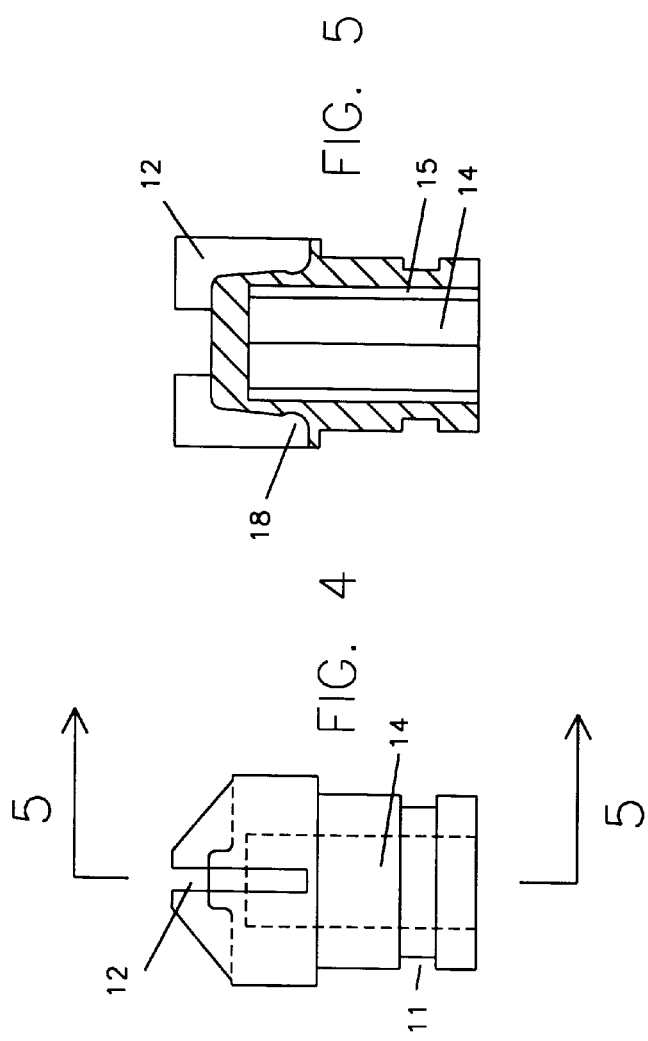

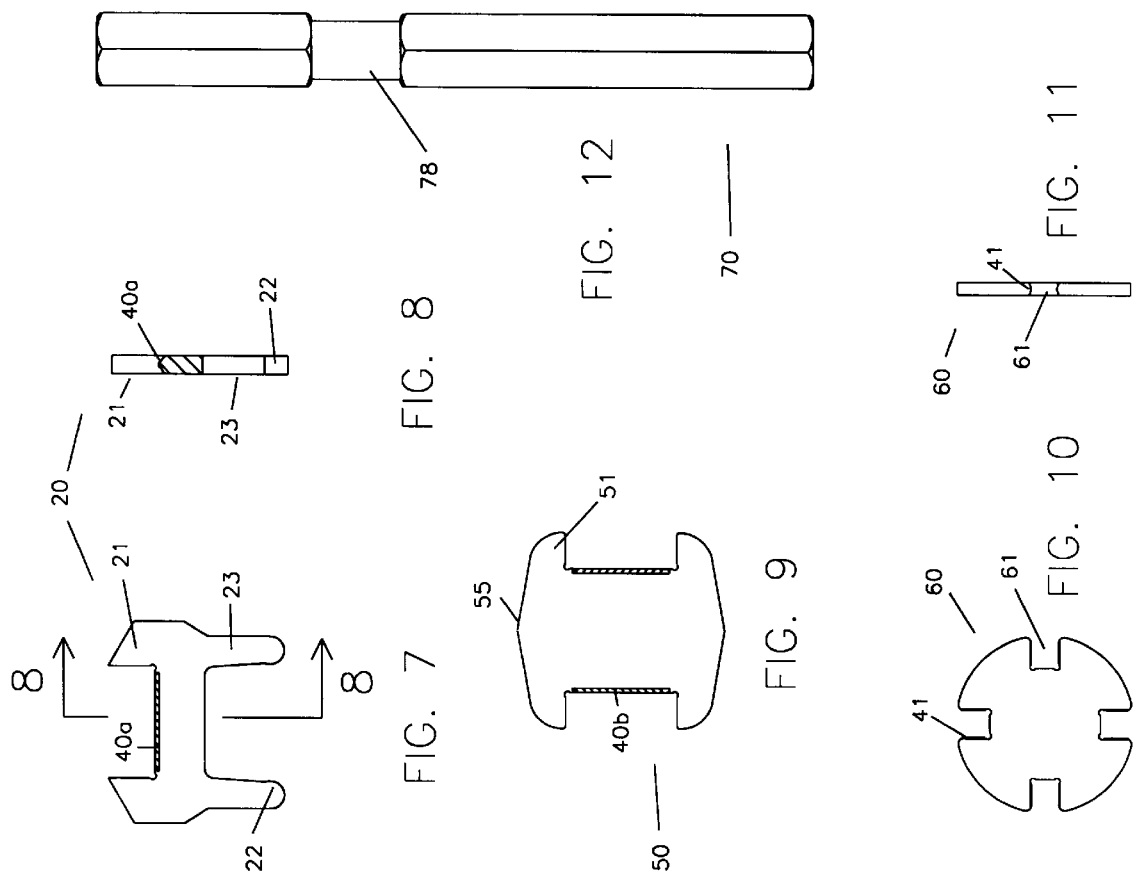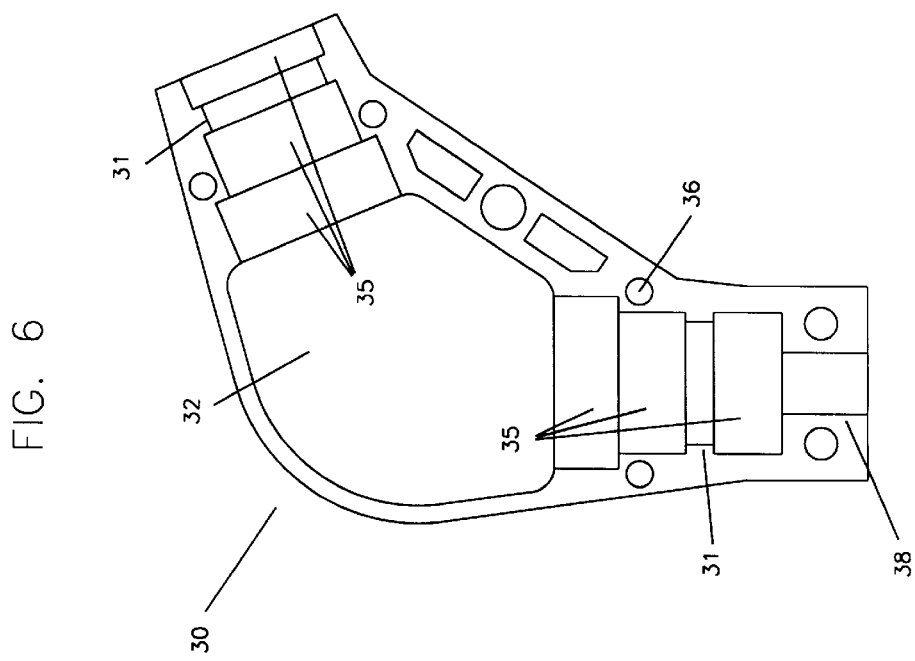

UNIVERSAL JOINT ANGLE DRIVING TOOL

FIELD OF THE INVENTION

The present invention relates to an angle adapter accessory for driving and drilling tools. A Hookes universal joint is the mechanism of the present invention.

BACKGROUND OF THE INVENTION

Hookes type universal joints are well known. Such a joint connects to the drive shaft of rear wheel drive motor vehicles and is often visible on medium duty trucks. A central "+" shaped element is pivotally connected at opposed distal ends to corresponding "Y" shaped yokes. The joint will transmit power at up to about a 35 degree angle and requires no external housing. Hookes universal joints work most smoothly when used in pairs.

U.S. Pat. No. 4,768,995 to Mangiavacchi shows a typical complete Hookes joint assembly.

U.S. Pat. No. 2,750,766 to Griswold shows an assembly of swiveling and sliding elements within a housing to form a 90° angle between two shafts. A central plate is pivotably attached at each end to slotted cylinders. The cylinders oscillate within holes cross drilled in the ends of the drive shafts.

U.S. Pat. No. 3,533,248 to Freund shows an assembly of slotted and tabbed plates to form a series of two Hookes universal joints. The drive shafts have slotted ends to receive end plates of the assembly. The plates are secured to the shafts by pins.

Another mechanism to transmit power at an angle is a bevel gear set. In this arrangement, the angle of transmission is fixed although, unlike universal joints, a drive ratio other than 1:1 may be used.

In contrast to prior art universal joints, the present invention has drive shafts rotatably mounted within a rigid housing with their rotational axes fixed at a pre-determined relative angle. The end plates are held to the drive shafts by spring latches built into the profile of the end plate.

In a preferred embodiment each drive shaft has an axial hexagonal recess so that a hexagonal shank may connect to the drive shaft from outside the housing. The drive shafts are identical but one has an input shank fitted in the recess. The input shank has a circumferencial groove to receive a rib of the housing so that the shank is held from pulling out of the recess.

The mechanism in a preferred embodiment comprises two sequential Hookes universal joints to produce double the angle of single such joint. The components of the universal joint are made from stamped steel. The steel components engage each other by simple pivoting contact. The contact occurs along a single line at each linkage point, where the linkages are in the form of tabs and slots.

Since there is minimal sliding at the pivoting linkage point, the drive system of the present invention is low friction and efficient.

The universal joint of the present invention is intended to operate at a fixed angle and to be grasped firmly by a user's hand. It is therefore fully contained in a rigid housing. The housing serves a further important function of holding the universal joint components together against tensile forces. The engagements of the metal plates must be held together by outside means or the tabs will pull out of the corresponding slots. The housing therefore holds rotating drive shafts and an input shank securely while the shafts support the end yokes of a universal joint assembly.

The angle drive assembly of the present invention may be used as an accessory tool for screwdriving and drilling, or as a sub assembly within a larger machine or device where an efficient low cost means to change a drive shaft angle is required.

The present invention addresses improved means to hold elements of the assembly together. Specifically a method to retain an input shank and an end linkage to a drive shaft is disclosed.

BRIEF DESCRIPTION OF THE DRAWINGS

FIG. 1 is a plan view of a drive shaft interior end for a universal joint.

FIG. 2 is a side elevation of the drive shaft of FIG. 1, with hidden views of an internal recess and plate retaining slots.

FIG. 3 is a plan elevation of the drive shaft of FIG. 1, rotated 180°, to show an exterior.

FIG. 4 is a side elevation of the drive shaft of FIG. 2, rotated axially by 90°.

FIG. 5 is a view, partly in section, of a drive shaft.

FIG. 6 is a plan elevation of the interior of one half of a housing body.

FIG. 7 is a plan elevation of an end plate.

FIG. 8 is a view, partly in section, through the thickness of the plate of FIG. 7.

FIG. 9 is a plan elevation of a center plate.

FIG. 10 is a plan elevation of a disk plate.

FIG. 11 is a side elevation of the disk plate of FIG. 10.

FIG. 12 is a plan elevation of an input shank.

DETAILED DESCRIPTION OF THE INVENTION

The invention comprises two sequentially linked Hookes universal joints in a housing.

Figure 13:
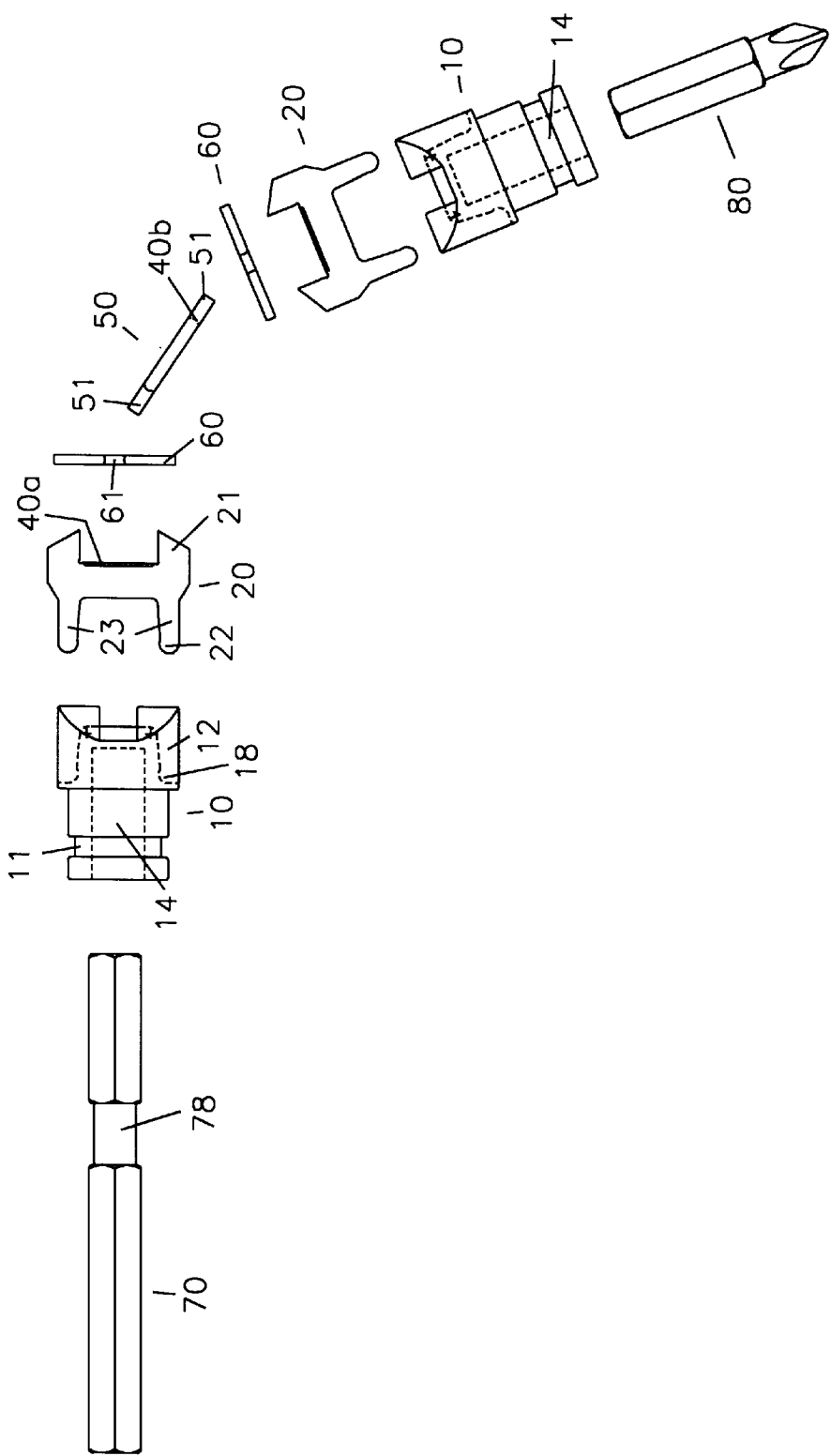
FIG. 13 is an exploded view of the rotating components of a universal joint.
Figure 14:
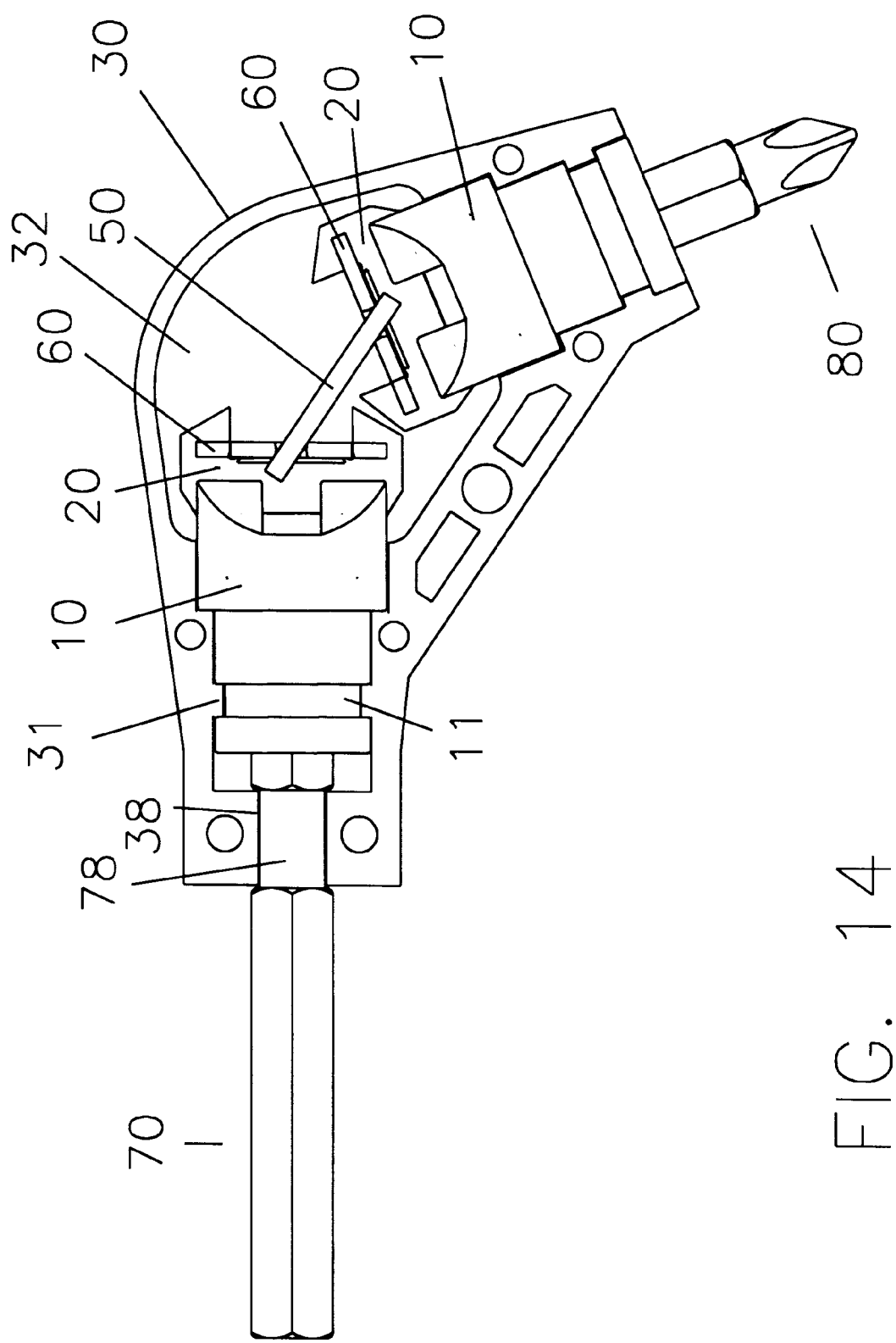
FIG. 14 is a view of an assembled universal joint, with a housing cover half removed.

The elements of the invention are grouped together in FIGS. 13 and 14. The distal end of shank 70 is inserted into a driving tool such as a power or hand screwdriver, not shown. The proximal end of shank 70 is held within recess 14 of input shaft 10. Input and output drive shafts 10 are structurally identical, differing only in their position within housing 30. Output shaft 10 is angled downward in the lower position in FIGS. 13 & 14. A reversed but identical housing 30, not shown, fits over housing 30 of FIG. 6 to form a complete housing. Rib 31 of housing 30 fits groove 11 of drive shaft 10 to prevent drive shaft 30 from being pushed into cavity 32 of housing 30. When housing 30 is assembled to a cover half, recessed regions 35 form an elongated circular cavity to serve as a bearing surface for drive shafts 10 as they rotate. Recess 14 of output shaft 10 receives a standard hexagonal drive bit 80.

Shank 70 includes circumferencial groove 78. Groove 78 fits against rib 38 of housing 30, as shown in FIG. 14. Rib 38 preferably has a circular cross section when two halves of housing 30 are assembled together. Shank 70 is free to rotate within housing 30 but held from pulling out by rib 38 around groove 78. Thus shank 70 fits in input shaft recess 14 in the same way as bit 80 fits in output shaft recess 14, but shank 70 cannot be pulled out of housing 30. Slots 15 of recess 14 preferably extend the length of recess 14 to position a bit retaining spring, not shown. The spring is provided at least in output shaft 10, and optionally in input shaft 10. Since rib 38 retains shank 70, an input shaft spring would be included only to keep the two drive shafts identical for ease of assembly.

Legs 23 of end linkages 20 fit into slots 12 of shafts 10. Legs 23 are spaced apart such that legs 23 fit tightly across the diameter of shaft 10 within slot 12. Bumps 22 at the distal end of legs 23 lock into recesses 18 of slot 12 when end linkage 20 is assembled to shaft 10. Legs 23 spread slightly resiliently apart as bumps 22 slide within slots 12 toward recesses 18. Wide spacing between legs 23 and secure confinement of legs 23 in slots 12 allow legs 23 to transmit torque in a straight line to tabs 21 of end linkage 20. The pair of tabs 21 form a drive shaft yoke.

Disks 60 each have four slots 61 and form the cross members of a Hookes universal joint. Tabs 21 of end linkages 20 engage one pair of slots 61 in each disk. The other pair of slots 61 in each disk is engaged by tabs 51 of center linkage 50. Tabs 51 form two opposed center link yokes.

Center linkage 50 preferably has a diamond shape, such that it is widest at the center of its length as shown at point 55 in FIG. 9. Center linkage 50 will be stiffer and stronger with such a diamond shape, which keeps a minimal width at each end to fit within a compact housing. Center linkage 50 occupies the central portion of cavity 32.

The principle of the present invention could be used as a single universal joint. According to this embodiment, center linkage 50, and one of disks 60 are deleted so that end linkages 20 engage each other through a single disk 60. A single universal joint of this type would provide half of the angle change of the double configuration.

Figure 15:
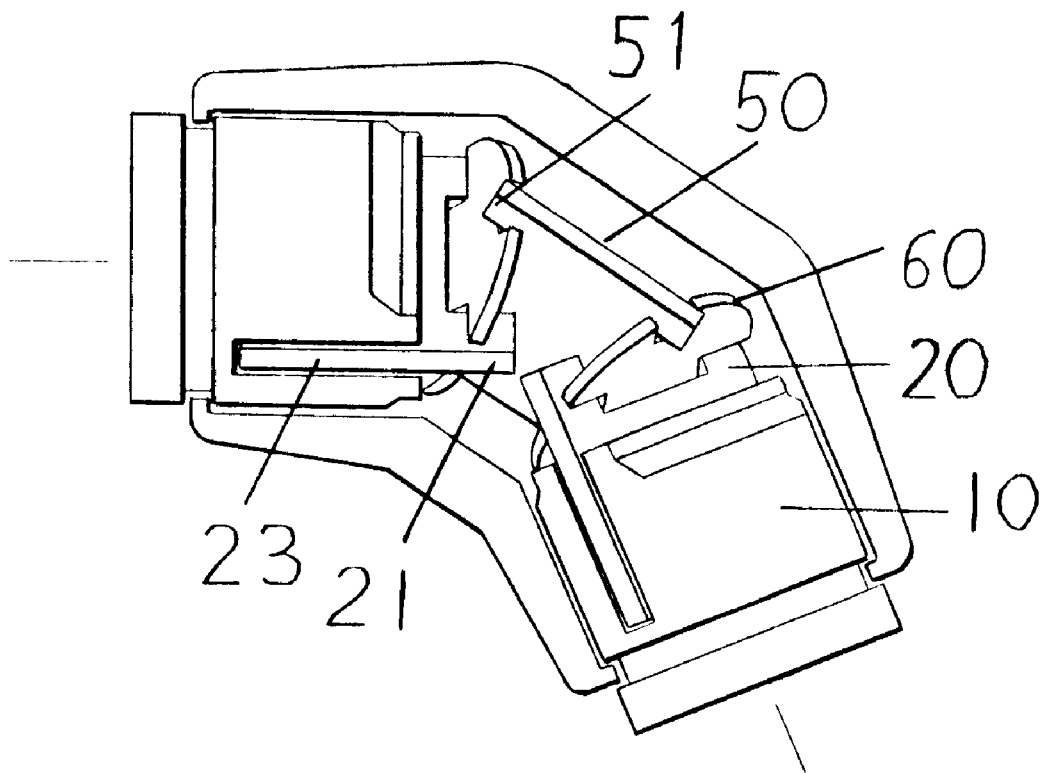
FIG. 15 is an isometric view of the rotating elements of a universal joint.

The slot and tab engagements are best visible in FIG. 15. Center linkage 50 functions similarly to an intermediate shaft in a standard double universal joint design.

Hookes universal joints are efficient up to about a 35 degree angle. In a preferred embodiment the total angle is 67 degrees. Each universal joint therefore gives a 33.5 degree angle, providing a margin to ensure efficient operation. Although a single Hookes universal joint provides uneven speed output, a pair in series gives smooth operation. Hence the angle driving system of the present invention gives smooth operation.

The tab and slot engagements of the present invention function by pivoting with minimal sliding. As linking plates 20, 50 and 60 increase in thickness, the torque transmitting ability of the system will increase.

In a preferred embodiment suitable for screwdriving type applications, the internal components are less than ¾ inch diameter with plates 20 and 50 being 0.062 inch thick. Disks 60 are 0.045 inch thick. Such a system provides torque in excess of 100 inch pounds when made of high strength steel. An alternate embodiment with increased diameter and/or thicker plates will give additional torque capacity. The above described system will function up to at least 1,200 revolutions per minute.

Some sliding will occur as a result of the pivoting action between the links and disks of the universal joint. Pivot locations are the parallel side edges 41 in the slots 61 of disk 60, edge 40a of linkage 20 and edge 40b of center linkage 50.

A flat edge would have corners which at these pivot locations exaggerate the sliding which occurs. To minimize such sliding, edges 40 and 41 may be slightly pointed as shown typically in FIG. 8 at 40a. A more pure pivoting action will result.

A small amount of grease at each pivot location will further increase the efficiency of the universal joint system.

Shafts 10 may be steel, die cast zinc, or other suitable material.

Disks 60 are not necessarily circular. A rectangular or other outer shape may be used. In addition, tabs 21 may engage fully surrounded holes rather than slots 61 open at one end.

Those skilled in the art may now make numerous uses of the teachings of the present invention without departing from the spirit and teachings of the present invention, which are defined solely by the scope of the following claims.

What is claimed is:

1. A Hookes type, double universal joint angle driving assembly including:

a rigid outer housing with openings at each of two ends and an interior cavity between the openings;

a drive shaft rotatably fitted within each opening, the drive shaft comprising a cylindrical body including a length, extending from an outer end exposed outside the housing to an inner end facing the interior cavity, a diameter and an external cylindrical surface;

a recess in the outer end of an output drive shaft, the recess able to receive a removable driven element, including a screwdriver bit;

two slots forming recesses in the cylindrical surface of the drive shaft, the slots having a bottom and two sides, the slots elongated from a first slot end to a second slot end along the length of the drive shaft, the second slot end being nearest the housing interior cavity, the two slots being opposed across the diameter of the drive shaft;

a flat endplate attached to each drive shaft, at least one endplate having an attaching end comprising two substantially parallel legs extending within the slots from the second slot end to the first slot end, and a linked end of the endplate extending into the interior cavity;

the two parallel legs spaced apart and partially surrounding the recess in the outer end;

the endplate linked end comprising two tabs, the tabs forming an end yoke;

each yoke linked to a cross member;

each cross member further linked to yokes of a center linkage, the center linkage positioned between the endplates.

2. The angle driving assembly of claim 1 in which the center linkage comprises a flat plate and the yokes of the center linkage comprise tabs extending toward each drive shaft.

3. The angle driving assembly of claim 2 in which the flat plate of the center linkage has a length extending between the yokes of the center linkage, and a width, and the width is a maximum at a center of the length of the flat plate.

4. The angle driving assembly of claim 1 in which; the first slot end has a notch into the slot bottom;

each of the parallel legs includes at a distal end a bump, wherein the bump of each leg faces toward the other leg and the bump fits into the notch at the slot first end.

* * * * *